(12) United States Patent
Inoue et al.

(10) Patent No.: US 10,655,543 B2
(45) Date of Patent: May 19, 2020

(54) GAS TURBINE, COMBINED CYCLE PLANT, AND ACTIVATION METHOD OF GAS TURBINE

(71) Applicant: MITSUBISHI HITACHI POWER SYSTEMS, LTD., Kanagawa (JP)

(72) Inventors: Masakazu Inoue, Kanagawa (JP); Masayuki Murakami, Kanagawa (JP)

(73) Assignee: Mitsubishi Hitachi Power Systems, Ltd., Kanagawa (JP)

( * ) Notice: Subject to any disclaimer, the term of this patent is extended or adjusted under 35 U.S.C. 154(b) by 408 days.

(21) Appl. No.: 15/507,547

(22) PCT Filed: Sep. 15, 2015

(86) PCT No.: PCT/JP2015/076169
§ 371 (c)(1),
(2) Date: Feb. 28, 2017

(87) PCT Pub. No.: WO2016/052177
PCT Pub. Date: Apr. 7, 2016

(65) Prior Publication Data
US 2017/0284307 A1    Oct. 5, 2017

(30) Foreign Application Priority Data
Oct. 3, 2014   (JP) .................... 2014-204692

(51) Int. Cl.
*F02C 9/18*    (2006.01)
*F01D 25/12*   (2006.01)
(Continued)

(52) U.S. Cl.
CPC ............. *F02C 9/18* (2013.01); *F01D 11/24* (2013.01); *F01D 19/00* (2013.01); *F01D 25/12* (2013.01);
(Continued)

(58) Field of Classification Search
CPC .. F01K 23/06; F01K 23/10; F02C 9/18; F02C 6/08; F02C 7/185; F02C 9/185;
(Continued)

(56) References Cited

U.S. PATENT DOCUMENTS 3,398,881 A * 8/1968 Greenberg ............ F04D 29/321
                                                        415/144
6,367,242 B1    4/2002 Uematsu et al.
(Continued)

FOREIGN PATENT DOCUMENTS

| JP | 11-50809 | 2/1999 |
| JP | 11-159306 | 6/1999 |

(Continued)

OTHER PUBLICATIONS

International Search Report dated Dec. 22, 2015 in International (PCT) Application No. PCT/JP2015/076169.
(Continued)

*Primary Examiner* — Todd E Manahan
*Assistant Examiner* — Thuyhang N Nguyen
(74) *Attorney, Agent, or Firm* — Wenderoth, Lind & Ponack, L.L.P.

(57) ABSTRACT

A gas turbine includes an air cooler that subjects compressed air extracted from a compressor to heat exchange and supplies the cooled compressed air to a cooling system of a rotor system in a turbine; an air cooler bypass line that bypasses the compressed air introduced into the air cooler; an electric valve provided in the air cooler bypass line; and a control unit. The control unit controls opening and closing of the electric valve such that, during activation of a gas turbine, a degree of opening of the electric valve is set at or below a low-level degree of opening and such that, after the
(Continued)

load of the gas turbine has been increased, the degree of opening of the electric valve is set to be larger than the low-level degree of opening.

5 Claims, 3 Drawing Sheets

(51) Int. Cl.
*F02C 7/18* (2006.01)
*F01D 11/24* (2006.01)
*F01K 23/10* (2006.01)
*F02C 7/28* (2006.01)
*F01D 19/00* (2006.01)
*F01K 23/08* (2006.01)
*F02C 3/04* (2006.01)
*F02C 6/18* (2006.01)

(52) U.S. Cl.
CPC .............. *F01K 23/08* (2013.01); *F01K 23/10* (2013.01); *F02C 3/04* (2013.01); *F02C 6/18* (2013.01); *F02C 7/18* (2013.01); *F02C 7/185* (2013.01); *F02C 7/28* (2013.01); *F05D 2220/72* (2013.01); *F05D 2260/213* (2013.01); *Y02E 20/16* (2013.01); *Y02T 50/671* (2013.01); *Y02T 50/676* (2013.01)

(58) Field of Classification Search
CPC ... F01D 7/00; F01D 7/02; F01D 11/14; F01D 11/20; F01D 19/00; F01D 19/02; Y02E 20/16
See application file for complete search history.

(56) References Cited

U.S. PATENT DOCUMENTS

| 6,698,182 B2* | 3/2004 | Sonoda .................. F01K 23/10 |
| | | 60/39.182 |
| 6,978,623 B2* | 12/2005 | Hyakutake .............. F01D 21/12 |
| | | 415/114 |
| 7,293,953 B2 | 11/2007 | Leach et al. |
| 8,365,514 B1* | 2/2013 | Kupratis .................. F02K 3/06 |
| | | 60/226.1 |
| 2003/0046939 A1 | 3/2003 | Hyakutake et al. |
| 2010/0281877 A1* | 11/2010 | Asanaka ................. F01K 13/02 |
| | | 60/778 |
| 2013/0084162 A1 | 4/2013 | Sano et al. |

FOREIGN PATENT DOCUMENTS

| JP | 2003-120328 | 4/2003 |
| JP | 3716188 | 9/2005 |
| JP | 4004800 | 8/2007 |
| JP | 2008-38807 | 2/2008 |
| JP | 4488631 | 4/2010 |
| JP | 5174190 | 1/2013 |
| JP | 2013-83250 | 5/2013 |
| JP | 2013-199925 | 10/2013 |

OTHER PUBLICATIONS

Written Opinion of the International Searching Authority dated Dec. 22, 2015 in International (PCT) Applicaiton No. PCT/JP2015/076169, with English translation.

* cited by examiner

GAS TURBINE, COMBINED CYCLE PLANT, AND ACTIVATION METHOD OF GAS TURBINE

TECHNICAL FIELD

The present invention relates to a gas turbine which obtains rotational power, for example, by supplying fuel to high-temperature, high-pressure compressed air, combusting the fuel and air, and supplying the generated combustion gas to a turbine, and also relates to a combined cycle plant to which this gas turbine is applied, and an activation method of this gas turbine.

BACKGROUND ART

A typical gas turbine is configured by a compressor, a combustor, and a turbine. The compressor generates high-temperature, high-pressure compressed air by compressing air taken in from an air inlet port. The combustor obtains high-temperature, high-pressure combustion gas by supplying fuel to the compressed air and causing the fuel and air to combust. The turbine is driven by this combustion gas, and drives a power generator coaxially connected to the turbine.

The turbine in this gas turbine is configured by a plurality of vanes and blades alternately disposed inside a casing along a flow direction of the combustion gas. The combustion gas generated in the combustor drives a rotor to rotate by passing through the plurality of vanes and blades, and thus drives the power generator connected to the rotor.

Incidentally, in the gas turbine, part of the compressed air compressed in the compressor is extracted and used to cool a turbine casing and the vanes. Further, after part of the compressed air is guided to the outside and cooled by an air cooler, this compressed air cools turbine disks and the blades. In this case, the air cooler cools the compressed air using feed water (cooling fluid) supplied from an exhaust heat recovery boiler, for example. In order not to cause the performance of the gas turbine to deteriorate, this turbine adopts a structure that inhibits the combustion gas from flowing through a gap (clearance) by minimizing the gap between tip ends of the blades and the inner peripheral surface of the turbine casing, to such an extent that there is no interference therebetween.

An example of such a gas turbine is disclosed in Japanese Patent No. 4488631B. A combined cycle power generation facility disclosed in Japanese Patent No. 4488631B is provided with an extracted air cooler that generates cooling air by exchanging heat between water heated in an economizer and compressed air extracted from a compressor, a bypass system that bypasses the extracted air cooler, and an adjustment valve that adjusts an amount of air flowing through a bypass pipe. In this combined cycle power generation facility, when a rapid change in load occurs at the plant, the air temperature is controlled by adjusting the amount of air.

Incidentally, when activating the gas turbine, the blades of the turbine rotate at a high speed, and at the same time, they are affected by the combustion gas from early on. As a result, tip portions of the blades elongate outward in the radial direction. On the other hand, since the turbine casing has a large thermal capacity, the amount of outward elongation in the radial direction is small therein. As a result, a clearance between the tip ends of the blades of the turbine and the inner peripheral surface of the turbine casing becomes small. In this case, if the clearance between the tip ends of the blades of the turbine and the inner peripheral surface of the turbine casing is set in accordance with the time at which the gas turbine is activated, this clearance becomes larger than necessary during steady operation of the gas turbine. As a result, a problem arises in which recovery efficiency of the driving force generated by the turbine deteriorates, and consequently, the performance of the gas turbine itself deteriorates. At this time, although the adjustment valve of the bypass system in the air cooler may be used as a control valve, when a driving source or a control signal is lost, a degree of opening of the adjustment valve cannot be retained. Thus, when the valve is fully opened, there is a risk that the cooling air temperature may rise and cause contact. Further, when the valve is fully closed, there is a problem that the cooling air temperature may fall and cause the clearance to expand, thus causing deterioration in performance.

In order to solve the problems described above, an object of the present invention is to provide a gas turbine that is capable of ensuring safety and improving performance by having an appropriate amount of clearance between a turbine casing and blades.

Solution to Problems

In order to achieve the object described above, a gas turbine of the present invention includes: a compressor configured to compress air; a combustor configured to mix and combust fuel and compressed air compressed by the compressor; a turbine configured to obtain rotational power from combustion gas generated by the combustor; an air cooler configured to subject compressed air extracted from the compressor to heat exchange and supply the cooled compressed air to a cooling system of a rotor system in the turbine; an air cooler bypass line configured to bypass compressed air introduced into the air cooler; a first (cooler bypass) valve provided in the air cooler bypass line; and a control unit configured to control opening and closing of the cooler bypass valve such that, during activation of the gas turbine, a degree of opening of the cooler bypass valve is set at or below a pre-set predetermined low-level degree of opening, and such that, after an increase of the load of the gas turbine, the degree of opening of the cooler bypass valve is set to be larger than the low-level degree of opening.

Therefore, during the activation of the gas turbine, when the degree of opening of the cooler bypass valve is set at or below the low-level degree of opening, the amount of compressed air passing through the air cooler bypass line decreases, and on the other hand, the amount of compressed air introduced into the air cooler increases. Thus, the temperature of the compressed air supplied to the cooling system of the rotor system in the turbine falls, and thermal elongation of the rotor system caused by the combustion gas is suppressed. As a result, a gap (clearance) between blades and a turbine casing is set to an appropriate amount, so that a risk of contact between tip ends of the blades and the inner peripheral surface of the turbine casing is inhibited, and safety can be thus secured. Further, after the increase of the load, by setting the degree of opening of the first (cooler bypass) valve to be larger than the low-level degree of opening, the amount of compressed air passing through the air cooler bypass line increases, and on the other hand, the amount of compressed air introduced into the air cooler decreases. Thus, in comparison to during the activation, a degree of lowering of the temperature of the compressed air supplied to the cooling system of the rotor system in the turbine decreases. As a result, the above-described gap becomes narrower, and the performance of the gas turbine can be improved.

The gas turbine of the present invention further includes a detection unit that detects the degree of opening of the first (cooler bypass) valve. When the detection unit detects that the degree of opening of the first valve is at or below the low-level degree of opening, the control unit starts activating the gas turbine.

Therefore, by confirming that the degree of opening of the first valve is at or below the low-level degree of opening before activating the gas turbine, it is possible to inhibit a risk of contact between the tip ends of the blades and the inner peripheral surface of the turbine casing that is caused by the gas turbine having been activated in a state in which the amount of compressed air introduced into the air cooler is small and by the rotor system not being sufficiently cooled.

In the gas turbine of the present invention, the first (cooler bypass) valve is capable of retaining the degree of opening at a time when a control signal indicating a degree of opening or a driving source of the valve is cut off.

Therefore, by adopting the valve capable of retaining the degree of opening at the time when the control signal or the driving source of the valve is cut off as the first valve, even when a control system or a power supply system is lost, the first valve retains the current degree of opening. As a result, the amount of compressed air introduced into the air cooler does not change, so the rotor system is appropriately cooled, and the gap (clearance) between the blades and the turbine casing can be thus appropriately retained.

In the gas turbine of the present invention, when an abnormal state arises in which a clearance between a rotating system and a static system in the gas turbine becomes small, the control unit performs control to decrease the degree of opening of the first valve down to or below the low-level degree of opening.

Therefore, when the abnormal state occurs in which the clearance between the rotating system and the static system becomes small for some reason, the control is performed to decrease the degree of opening of the first (cooler bypass) valve down to or below the low-level degree of opening. As a result, the amount of compressed air introduced into the air cooler increases, and the temperature of the compressed air supplied to the cooling system of the rotor system falls. Thus, the thermal elongation of the rotor system caused by the combustion gas is suppressed, and the gap (clearance) between the blades and the turbine casing is expanded. As a result, the safety can be improved.

In the gas turbine of the present invention, when an operation is performed in which the clearance between the rotating system and the static system in the gas turbine becomes small, the control unit performs control to decrease the degree of opening of the first (cooler bypass) valve down to or below the low-level degree of opening.

Therefore, when the operation is performed in which the clearance between the rotating system and the static system in the gas turbine becomes small in response to changes in the load and the like, the control is performed to decrease the degree of opening of the first valve down to or below the low-level degree of opening. As a result, the amount of compressed air introduced into the air cooler increases, and the temperature of the compressed air supplied to the cooling system of the rotor system falls. Thus, the thermal elongation of the rotor system caused by the combustion gas is suppressed, and the gap (clearance) between the blades and the turbine casing is expanded. As a result, the safety can be improved.

In the gas turbine of the present invention, the degree of opening of the first valve that is set at or below the predetermined low-level degree of opening represents a state in which the first valve is slightly open. In other words, even when the degree of opening of the first valve is set at or below the predetermined low-level degree of opening, the first valve is still open (although only slightly).

If control is performed to completely close the first valve that is set to a degree of opening at or below the predetermined low-level degree of opening, there is a risk that the flow of the compressed air in the air cooler bypass line may stagnate and a drain may occur due to a fall in temperature. However, by setting the degree of opening of the first valve that is at or below the low-level degree of opening as the slightly open state, only a tiny amount of the compressed air flows through the air cooler bypass line, so the occurrence of the drain can be suppressed.

Further, a combined cycle plant of the present invention includes: the gas turbine; an exhaust heat recovery boiler configured to generate steam from exhaust heat of exhaust gas discharged from the gas turbine; a steam turbine configured to be driven by the steam generated by the exhaust heat recovery boiler; a condenser configured to condense the steam discharged from the steam turbine and generate water; a feed water line configured to deliver feed water, obtained from the condenser via an economizer, to the air cooler and cause the feed water to exchange heat with compressed air; an economizer bypass line configured to bypass feed water introduced into the economizer; and a second (economizer bypass) valve provided in the economizer bypass line. During activation of the gas turbine, the control unit performs control to close the first (cooler bypass) valve such that the degree of opening of the first valve is set at or below the low-level degree of opening, in order to decrease an amount of compressed air bypassed to the air cooler bypass line, and at the same time, performs control to increase a degree of opening of the second (economizer bypass) valve, in order to increase an amount of feed water bypassed to the economizer bypass line. After an increase of the load of the gas turbine, the control unit performs control to open the first valve such that the degree of opening of the first valve is set to be larger than the low-level degree of opening, in order to increase the amount of compressed air bypassed to the air cooler bypass line, and at the same time, performs control to decrease the degree of opening of the second valve, in order to decrease the amount of feed water bypassed to the economizer bypass line.

Therefore, during the activation of the gas turbine, the control is performed to decrease the degree of opening of the first valve down to or below the low-level degree of opening, in order to decrease the amount of compressed air bypassed to the air cooler bypass line, and at the same time, the control is performed to increase the degree of opening of the second valve, in order to increase the amount of feed water bypassed to the economizer bypass line. Specifically, during the activation of the gas turbine, when the amount of compressed air passing through the air cooler bypass line decreases, the amount of compressed air introduced into the air cooler increases. Further, when the amount of feed water passing through the economizer bypass line increases, the amount of feed water introduced into the economizer decreases. Therefore, since the amount of compressed air introduced into the air cooler increases and the temperature of the feed water for cooling the compressed air falls, the temperature of the compressed air supplied to the cooling system of the rotor system in the turbine can be lowered. As a result, the thermal elongation of the rotor system caused by the combustion gas is suppressed, and the gap (clearance) between the blades and the turbine casing is set to the appropriate amount, so that the risk of contact between the tip ends of the blades and the inner peripheral surface of the turbine casing can be inhibited. Thus, the safety can be secured.

Further, after the increase of the load, the degree of opening of the first valve is set to be larger than the low-level degree of opening, in order to increase the amount of compressed air bypassed to the air cooler bypass line, and at the same time, the control is performed to decrease the degree of opening of the second valve, in order to decrease the amount of feed water bypassed to the economizer bypass line. Specifically, after the increase of the load of the gas turbine, when the amount of compressed air passing through the air cooler bypass line increases, the amount of compressed air introduced into the air cooler decreases. Further, when the amount of feed water passing through the economizer bypass line decreases, the amount of feed water introduced into the economizer increases. Thus, in comparison to during the activation, a degree of lowering of the temperature of the compressed air supplied to the cooling system of the rotor system in the turbine decreases. As a result, the above-described gap becomes narrower, and the performance of the gas turbine can be improved.

Further, in an activation method of a gas turbine of the present invention, the gas turbine includes a compressor configured to compress air, a combustor configured to mix and combust fuel and compressed air compressed by the compressor, a turbine configured to obtain rotational power from combustion gas generated by the combustor, an air cooler configured to subject compressed air extracted from the compressor to heat exchange and supply the cooled compressed air to a cooling system of a rotor system in the turbine, an air cooler bypass line configured to bypass compressed air introduced into the air cooler, and a first valve provided in the air cooler bypass line. The activation method of the gas turbine includes: setting a degree of opening of the first valve at or below a pre-set predetermined low-level degree of opening during activation of the gas turbine; and setting the degree of opening of the first valve to be larger than the low-level degree of opening after an increase of the load of the gas turbine.

Therefore, during the activation of the gas turbine, when the degree of opening of the first valve is set at or below the low-level degree of opening, the amount of compressed air passing through the air cooler bypass line decreases, and on the other hand, the amount of compressed air introduced into the air cooler increases. Thus, the temperature of the compressed air supplied to the cooling system of the rotor system in the turbine falls, and thermal elongation of the rotor system caused by the combustion gas is suppressed. As a result, a gap (clearance) between blades and a turbine casing is set to an appropriate amount, so that a risk of contact between tip ends of the blades and the inner peripheral surface of the turbine casing is inhibited, and safety can be thus secured.

Further, after the increase of the load, by setting the degree of opening of the first valve to be larger than the low-level degree of opening, the amount of compressed air passing through the air cooler bypass line increases, and on the other hand, the amount of compressed air introduced into the air cooler decreases. Thus, in comparison to during the activation, a degree of lowering of the temperature of the compressed air supplied to the cooling system of the rotor system in the turbine decreases. As a result, the above-described gap becomes narrower, and the performance of the gas turbine can be improved.

Advantageous Effects of Invention

According to the gas turbine, the combined cycle plant, and the activation method of the gas turbine of the present invention, during activation of the gas turbine, the degree of opening of the first valve is set at or below the low-level degree of opening, so that the amount of compressed air introduced into the air cooler increases, and the temperature of the compressed air supplied to the cooling system of the rotor system in the turbine falls. As a result, the thermal elongation of the rotor system caused by the combustion gas is suppressed, and the gap (clearance) between the blades and the turbine casing is set to the appropriate amount. Thus, the risk of contact between the tip ends of the blades and the inner peripheral surface of the turbine casing is inhibited, and the safety can be secured. At the same time, in comparison to during the activation, the degree of lowering of the temperature of the compressed air supplied to the cooling system of the rotor system in the turbine decreases, so that the imp becomes narrower, and the performance can be improved.

DESCRIPTION OF EMBODIMENT

A preferred embodiment of a gas turbine, a combined cycle plant, and an activation method of the gas turbine according to the present invention will be described below in detail with reference to the attached drawings. Note that the present invention is not limited by this embodiment, and, when there are a plurality of embodiments, the invention also includes combinations of those various embodiments.

Figure 1:
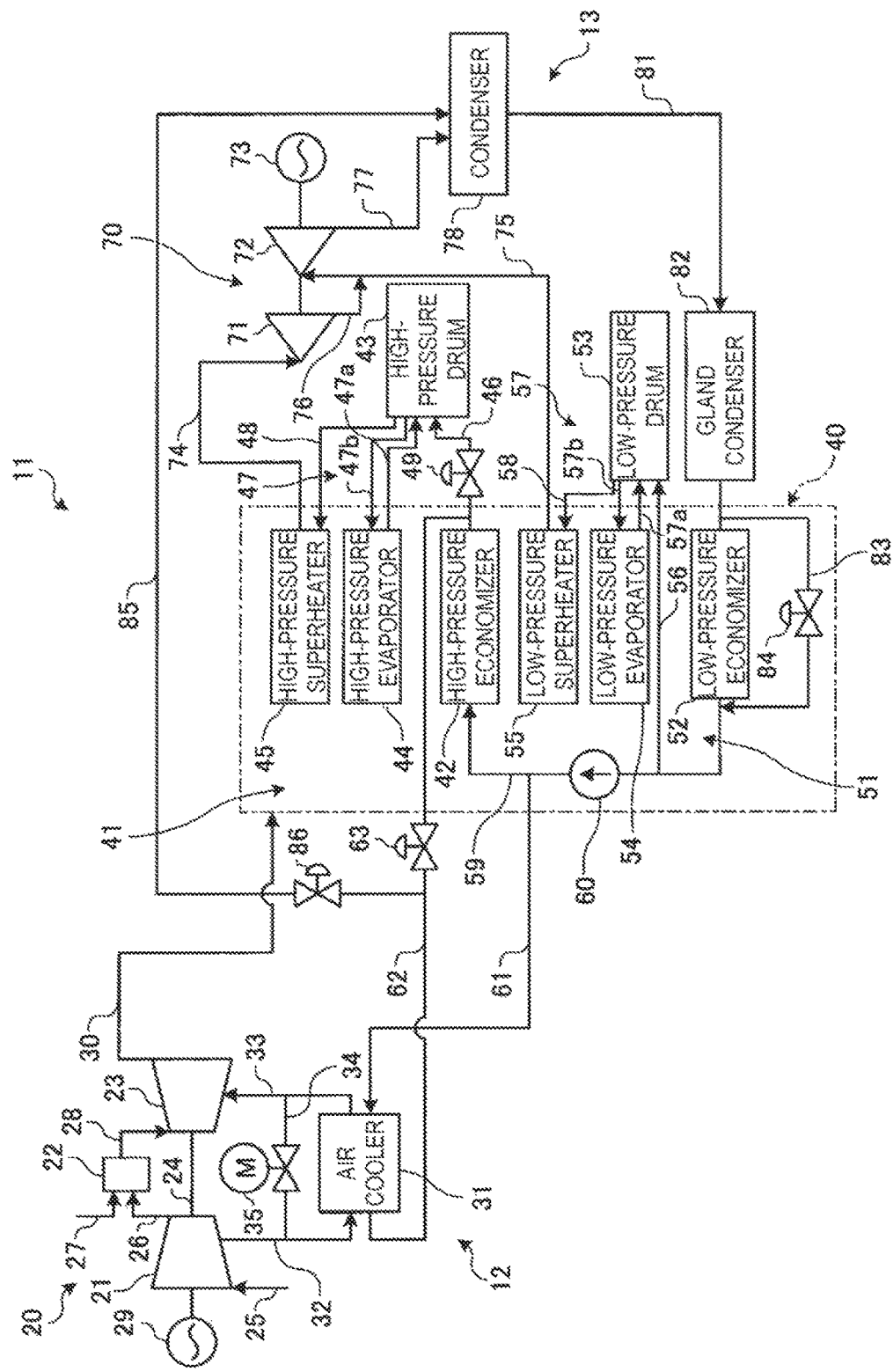
FIG. 1 is a schematic configuration diagram of a gas turbine combined cycle plant of a present embodiment.

FIG. 1 is a schematic configuration diagram of a gas turbine combined cycle plant of the present embodiment.

In the present embodiment, as illustrated in FIG. 1, a gas turbine combined cycle plant 11 is configured by a gas turbine part 12 and a steam turbine part 13. The gas turbine part 12 includes a gas turbine 20. This gas turbine 20 includes a compressor 21, a combustor 22, and a turbine 23. The compressor 21 and the turbine 23 are connected to each other by a rotating shaft (rotor) 24 so as to be capable of integrated rotation. The compressor 21 compresses air taken in from an air intake line 25. The combustor 22 mixes and combusts compressed air supplied from the compressor 21 via a compressed air supply line 26 and fuel gas supplied from a fuel gas supply line 27, The turbine 23 is rotated by combustion gas supplied from the combustor 22 via a combustion gas supply line 28. A power generator 29 is provided coaxially with the compressor 21 and the turbine 23, and is capable of generating power by the rotation of the turbine 23.

Further, the gas turbine part 12 includes an air cooler 31 that cools the compressed air obtained by being extracted from the compressor 21 and supplies the compressed air to a cooling system of a rotor system (a rotating system) in the turbine 23. Specifically, the gas turbine part 12 is provided with an air extraction line 32 that extracts the compressed air from the compressor 21, and also with a cooling air supply line 33 that cools the extracted compressed air and supplies the compressed air to the cooling system of the rotor system in the turbine 23. The air cooler 31 is provided between the air extraction line 32 and the cooling air supply line 33, and cools the compressed air extracted from the compressor 21. Further, an air cooler bypass line 34 is provided that bypasses the compressed air introduced into the air cooler 31, and an electric valve (a first or cooler bypass valve) 35 is provided in this air cooler bypass line 34. This air cooler bypass line 34 connects the air extraction line 32 and the cooling air supply line 33 so as to bypass the air cooler 31, and causes the compressed air, which has been extracted from the compressor 21 via the air extraction line 32, to flow into the cooling air supply line 33, while applying no load thereto and maintaining the current pressure, temperature, flow rate, and the like thereof. Note that the gas turbine part 12 includes an air cooling passage (not illustrated) that supplies the compressed air obtained by being extracted from an air bleed chamber of the compressor 21 to a cooling system of a turbine casing (a static system) in the turbine 23.

The steam turbine part 13 includes an exhaust heat recovery boiler 40. This exhaust heat recovery boiler 40 generates steam using waste heat of exhaust gas discharged from the gas turbine 20 via an exhaust gas discharge line 30, and includes a high-pressure unit 41 and a low-pressure unit 51. As a result of the exhaust gas from the gas turbine 20 being transferred upward in the interior of the exhaust heat recovery boiler 40, this exhaust heat recovery boiler 40 generates steam by recovering heat in the high-pressure unit 41 and the low-pressure unit 51 in this order.

The high-pressure unit 41 includes a high-pressure economizer 42, a high-pressure drum 43, a high-pressure evaporator 44, and a high-pressure superheater 45, Thus, the feed water heated in the high-pressure economizer 42 is delivered to the high-pressure drum 43 via a first high-pressure feed water line 46, and delivered to the high-pressure evaporator 44 via a high-pressure drum downcomer pipe 47a and a high-pressure drum riser pipe 47b of a second high-pressure feed water line 47. The feed water is heated in the high-pressure evaporator 44 so as to generate high-pressure steam, and the generated high-pressure steam is delivered to the high-pressure superheater 45, via a high-pressure saturated steam pipe 48, and superheated therein. Then, a flow rate adjustment valve 49 is provided in the first high-pressure feed water line 46.

The low-pressure unit 51 includes a low-pressure economizer 52, a low-pressure drum 53, a low-pressure evaporator 54, and a low-pressure superheater 55. Thus, the feed water heated in the low-pressure economizer 52 is delivered to the low-pressure drum 53 via a first low-pressure feed water line 56, and delivered to the low-pressure evaporator 54 via a low-pressure drum downcomer pipe 57a and a low-pressure drum riser pipe 57b of a second low-pressure feed water line 57. The feed water is heated in the low-pressure evaporator 54 so as to generate low-pressure steam, and the generated low-pressure steam is delivered to the low-pressure superheater 55, via a low-pressure saturated steam pipe 58, and superheated therein.

The first high-pressure feed water line 46 includes a feed water line 59 that delivers the feed water of the first low-pressure feed water line 56 to the high-pressure economizer 42 using a feed water pump 60. Specifically, the feed water line 59 is provided between the first low-pressure feed water line 56 and the high-pressure economizer 42, and includes the feed water pump 60. Thus, part of the feed water of the low-pressure economizer 52 is delivered to the high-pressure economizer 42 by the feed water pump 60 via the feed water line 59. A first cooling fluid supply line 61 is provided that branches out from a section of the feed water line 59 positioned further to the downstream side than the feed water pump 60 and reaches the air cooler 31. At the same time, a second cooling fluid supply line 62 is provided that extends from the air cooler 31 and reaches a section of the first high-pressure feed water line 46 at a position further to the upstream side than the flow rate adjustment valve 49. Further, a temperature adjustment valve 63 is provided in the second cooling fluid supply line 62.

Further, the steam turbine part 13 includes a steam turbine 70. The steam turbine 70 is driven by the steam generated by the exhaust heat recovery boiler 40, and includes a high-pressure turbine 71 and a low-pressure turbine 72. The high-pressure turbine 71 and the low-pressure turbine 72 are coaxially disposed, and each is connected to a power generator 73. The high-pressure steam from the high-pressure superheater 45 is supplied to the high-pressure turbine 71 via a high-pressure steam supply passage 74, and the low-pressure steam from the low-pressure superheater 55 is supplied to the low-pressure turbine 72 via a low-pressure steam supply passage 75. Then, the high-pressure steam discharged from the high-pressure turbine 71 is supplied to the low-pressure steam supply passage 75 via a high-pressure steam discharge passage 76, and the low-pressure steam discharged from the low-pressure turbine 72 is supplied to a condenser 78 via a low-pressure steam discharge passage 77.

The condenser 78 cools the collected steam using seawater so as to turn the steam into condensed water. This condenser 78 supplies the generated condensed water to the low-pressure economizer 52 via a condensed water supply line 81. A gland condenser 82 is provided in the condensed water supply line 81. Then, an economizer bypass line 83 is provided that bypasses the condensed water (feed water) introduced from the condensed water supply line 81 into the low-pressure economizer 52, and a bypass adjustment valve (a second or economizer bypass valve) 84 is provided in this economizer bypass line 83. Further, a feed water collection line 85 is provided that branches out from a section of the second cooling fluid supply line 62 positioned further to the upstream side than the temperature adjustment valve 63 and reaches the condenser 78, and a flow rate regulating valve 86 for securing a flow rate of cooling fluid supplied to the air cooler 31 is provided in the feed water collection line 85.

In the gas turbine combined cycle plant 11 having such a configuration, a clearance between tip ends of blades and a turbine casing in the turbine 23 is set to an amount of clearance that takes into account thermal elongation of the blades, the turbine casing and the like. From the point of view of a deterioration in recovery efficiency of the driving force generated by the turbine 23 and a resultant deterioration in the performance of the gas turbine 20 itself, it is desirable to minimize the clearance between the tip ends of the blades and the turbine casing in the turbine 23. However, when the gas turbine 20 is activated, the blades of the turbine 23 rotate at a high speed and are also affected by the combustion gas from early on. As a result, tip portions of the blades elongate outward in the radial direction. On the other hand, since the turbine casing has a large thermal capacity, an amount of outward elongation in the radial direction is small therein. Thus, the clearance between the tip ends of the blades of the turbine 23 and the inner peripheral surface of the turbine casing becomes small, and a risk of interference increases.

Figure 2:
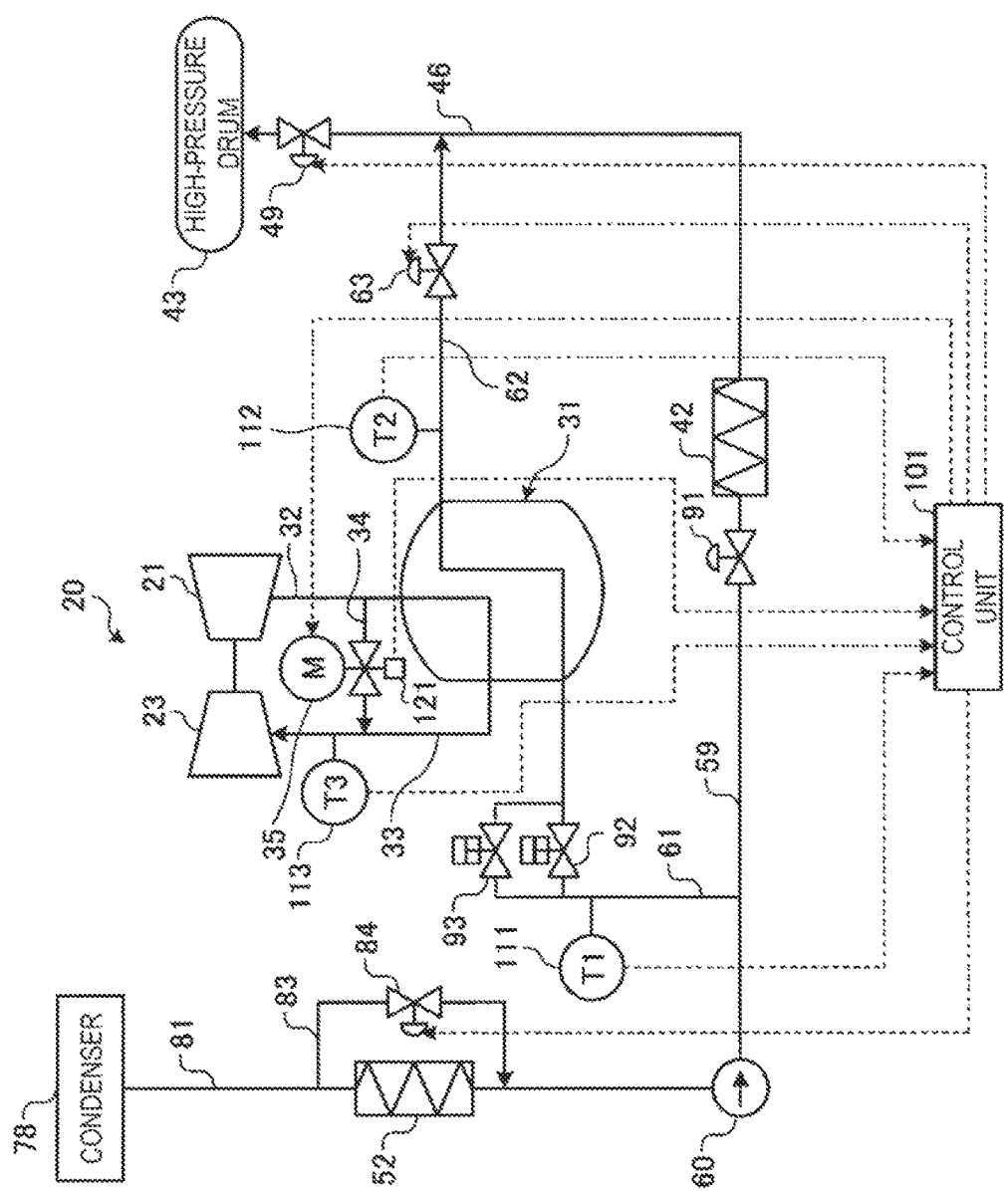
FIG. 2 is a schematic diagram of supply lines of compressed air and supply lines of feed water for an air cooler.

Therefore, in the present embodiment, as illustrated in FIG. 2, a control unit 101 is provided that can control opening and closing of the electric valve 35. During activation of the gas turbine 20, this control unit 101 sets a degree of opening of the electric (bypass) valve 35 at or below a predetermined low-level degree of opening that is set in advance, and after an increase of the load of the gas turbine 20, sets the degree of opening of the electric valve 35 to be larger than the low-level degree of opening.

Specifically, the condenser 78 is connected to the low-pressure economizer 52 via the condensed water supply line 81, and the low-pressure economizer 52 is connected to the high-pressure economizer 42 via the feed water line 59 that includes the feed water pump 60. Then, the economizer bypass line 83 is provided that extends from the condensed water supply line 81 and is connected to the feed water line 59 while bypassing the low-pressure economizer 52, and the bypass adjustment valve 84 is provided in the economizer bypass line 83. The high-pressure economizer 42 is connected to the high-pressure drum 43 via the first high-pressure feed water line 46 that includes the flow rate adjustment valve 49, and a pressure regulating valve 91 is provided in a section of the feed water line 59 positioned further to the upstream side than the high-pressure economizer 42.

Further, the first cooling fluid supply line 61 branching out from the feed water line 59 is connected to the air cooler 31, and a main valve 92 and an auxiliary valve 93 are provided side by side in the first cooling fluid supply line 61 so as to function as cooling fluid shut-off valves. The second cooling fluid supply line 62 extending from the air cooler 31 is connected to a section of the first high-pressure feed water line 46 positioned further to the downstream side than the high-pressure economizer 42 and further to the upstream side than the flow rate adjustment valve 49, and is provided with the temperature adjustment valve 63.

Further, a first temperature sensor 111 is provided at a section of the first cooling fluid supply line 61 positioned further to the upstream side than the main valve 92 and the auxiliary valve 93, and a second temperature sensor 112 is provided at a section of the second cooling fluid supply line 62 positioned further to the upstream side than the temperature adjustment valve 63. The first and second temperature sensors 111 and 112 output the measured temperature of the feed water (condensed water) to the control unit 101.

Meanwhile, the air extraction line 32 is provided that supplies the compressed air extracted from the compressor 21 to the air cooler 31, and at the same time, the cooling air supply line 33 is provided that supplies the compressed air cooled in the air cooler 31 to the cooling system of the rotor system in the turbine 23. Further, the air cooler bypass line 34 is provided that extends from the air extraction line 32 and reaches the cooling air supply line 33 while bypassing the air cooler 31, and the electric valve 35 is provided in the air cooler bypass line 34.

Further, a third temperature sensor 113 is provided at a section of the cooling air supply line 33 positioned further to the downstream side than a connecting portion of the air cooler bypass line 34. The third temperature sensor 113 outputs the measured temperature of the compressed air (cooling air) to the control unit 101.

Here the electric valve 35 is a valve that can retain the degree of opening of the valve when a control signal from the control unit 101, which indicates the degree of opening of the valve, is cut off, or when power from a driving source of the valve (a power device that is not illustrated in the drawings) is cut off. Specifically, although not illustrated in the drawings, a valve body of the electric valve 35 can be moved so as to change the degree of opening by decelerating a rotational driving force of an electric motor using a decelerator and transmitting the force to the valve body. Thus, even when the control signal or the power supply is cut off, the electric valve 35 can stop at the current position and retain the degree of opening without moving toward an opening side or a closing side.

The electric valve 35 is provided with an opening degree sensor (a detection unit) 121 that detects the degree of opening of the electric valve 35. The opening degree sensor 121 outputs a detected degree of opening of the electric valve 35 to the control unit 101. Then, when the opening degree sensor 121 detects that the degree of opening of the electric valve 35 is at or below the low-level degree of opening, the control unit 101 starts activating the gas turbine 20.

Further, when an abnormal state arises in which the clearance between the rotating system and the static system in the gas turbine 20 becomes small, the control unit 101 performs control to decrease the degree of opening of the electric valve 35 down to or below the low-level degree of opening. Furthermore, when a type of operation is performed in which the clearance between the rotating system and the static system in the gas turbine 20 becomes small, the control unit 101 performs the control to decrease the degree of opening of the electric valve 35 down to or below the low-level degree of opening. Here, the degree of opening of the electric valve 35 at or below the low-level degree of opening preferably represents a state in which the electric valve 35 is slightly open, but may also be zero degree (fully closed).

Further, during the activation of the gas turbine 20, the control unit 101 performs the control to close the electric valve 35 such that the degree of opening of the electric valve 35 is at or below the low-level degree of opening, in order to decrease an amount of the compressed air bypassed to the air cooler bypass line 34, and at the same time, performs control to increase the degree of opening of the bypass adjustment valve 84, in order to increase an amount of the feed water bypassed to the economizer bypass line 83. On the other hand, after the load of the gas turbine 20 has increased, the control unit 101 performs control to open the electric valve 35 so as to set the degree of opening of the electric valve 35 to be larger than the low-level degree of opening, in order to increase the amount of compressed air bypassed to the air cooler bypass line 34, and at the same time, performs control to decrease the degree of opening of the bypass adjustment valve 84, in order to decrease the amount of feed water bypassed to the economizer bypass line 83.

Figure 3:
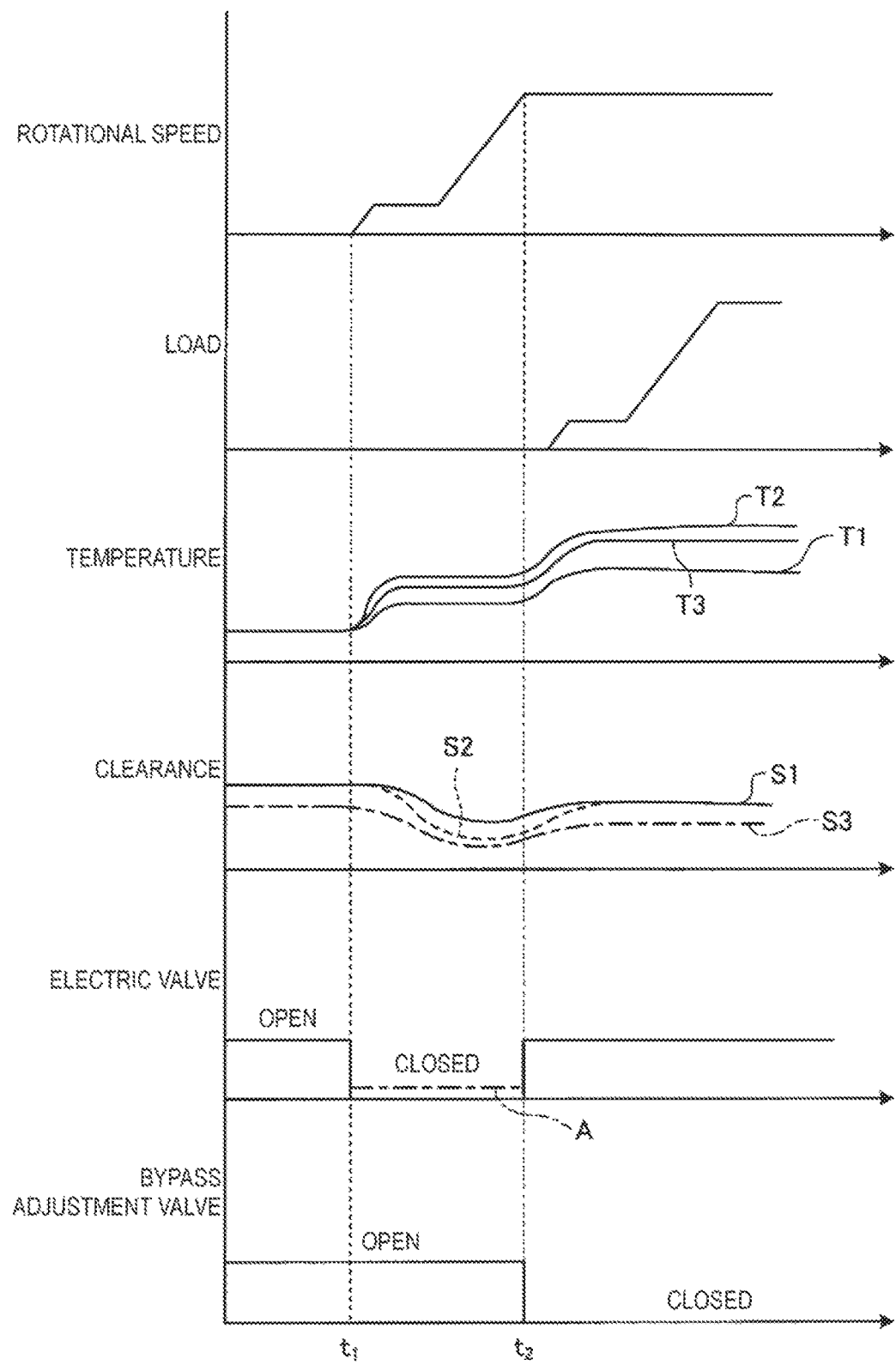
FIG. 3 is a time chart showing state changes when activating a gas turbine.

Here, an activation method of the gas turbine 20 will be described. As illustrated in FIGS. 2 and 3, at a time t1, when the gas turbine 20 is activated, the rotational speed of the rotor 24 increases, and at a time t2, the rotational speed of the rotor 24 reaches a rated rotational speed and is maintained at a constant value. In the meantime, the compressor 21 takes in air from the air intake line 25, and generates the high-temperature, high-pressure compressed air as a result of the air passing through the plurality of vanes and blades and being compressed. The combustor 22 is ignited before the rotational speed of the rotor 24 reaches the rated rotational speed, and generates the high-temperature, high-pressure combustion gas by supplying fuel to the compressed air and combusting the fuel and compressed air. The turbine 23 causes the rotor 24 to be driven to rotate as a result of the combustion gas passing through the plurality of vanes and blades. Thus, after that, the load (output) of the gas turbine 20 increases, then reaches a rated load (a rated output), and is maintained at a constant value.

When the gas turbine 20 is thus activated, the blades of the turbine 23 become displaced (elongated) outward in the radial direction as a result of being rotated at a high speed, and after that, become further displaced (elongated) outward as a result of being heated by the high-temperature, high-pressure combustion gas. Meanwhile, a blade ring on the turbine casing side also becomes displaced (elongated) outward as a result of being heated by the high-temperature, high-pressure combustion gas. At this time, the compressed air obtained by being extracted from the compressor 21 is cooled by the air cooler 31, and is further cooled by being supplied to the rotor 24 and the blades of the turbine 23. In addition, the compressed air obtained by being extracted from the air bleed chamber of the compressor 21 is cooled by being supplied to the turbine casing of the turbine 23.

However, compared with the blade ring on the turbine casing side, the rotor 24 and the blades of the turbine 23 undergo a larger amount of displacement toward the outside, because the rotor 24 and the blades are subject to more heat from the high-temperature, high-pressure combustion gas. Thus, a pinch point (a minimum clearance) occurs in which the clearance between the tip ends of the blades and the inner peripheral surface of the blade ring temporarily decreases to a significant extent. Specifically, a clearance S2 (a dotted line) between the tip ends of the blades and the inner peripheral surface of the blade ring (illustrated in FIG. 3) significantly decreases in a transitional period before the rotational speed of the rotor 24 reaches the rated rotational speed.

Thus, in the present embodiment, during the activation of the gas turbine 20, the degree of opening of the electric valve 35 is set at or below the predetermined low-level degree of opening that is set in advance, and after the increase of the load of the gas turbine 20, the degree of opening of the electric valve 35 is set to be larger than the low-level degree of opening. Note that the degree of opening of the electric valve 35 at or below the low-level degree of opening represents a state in which the electric valve 35 is slightly open (a degree of opening A), but may also be zero degree (fully closed). Further, during the activation of the gas turbine 20, the control unit 101 performs control to open the bypass adjustment valve 84, and after the increase of the load of the gas turbine 20, performs control to decrease the degree of opening of the bypass adjustment valve 84.

Specifically, at the time t1 when the gas turbine 20 is activated, the degree of opening of the electric valve 35 is set at the low-level degree of opening (a degree of opening of several percent), and the degree of opening of the bypass adjustment valve 84 is set at a predetermined degree of opening that is set in advance (a degree of opening of 50 percent, for example). When the degree of opening of the electric valve 35 becomes the low-level degree of opening, the amount of compressed air passing through the air cooler bypass line 34 decreases, and the amount of compressed air introduced into the air cooler 31 increases. Further, when the degree of opening of the bypass adjustment valve 84 is increased up to the predetermined degree of opening, the amount of feed water passing through the economizer bypass line 83 increases, and the amount of feed water introduced into the low-pressure economizer 52 decreases.

Then, in the air cooler 31, the amount of compressed air introduced from the compressor 21 via the air extraction line 32 increases, and meanwhile, the temperature of the feed water introduced from the condenser 78 via the first cooling fluid supply line 61 falls. Thus, in the air cooler 31, the large amount of the compressed air introduced from the compressor 21 is cooled by the low-temperature feed water introduced from the condenser 78. In other words, during the activation, a degree of cooling of the compressed air used for cooling that is delivered to the cooling air supply line 33 is increased.

For example, when the feed water (condensed water) from the condenser 78 is at 40° C. the feed water that has passed through the low-pressure economizer 52, and the feed water that has passed through the economizer bypass line 83 are mixed, and the feed water of 50° C. is generated. Then, the feed water of 50° C. is introduced into the air cooler 31 by the feed water pump 60 via the first cooling fluid supply line 61. Meanwhile, the temperature of the compressed air extracted from the compressor 21 is 400° C. Therefore, the air cooler 31 cools the compressed air of 400° C. using the feed water of 50° C. As a result, the compressed air of 400° C. is cooled down to 200° C., and then supplied to the cooling system of the turbine 23, and the temperature of the feed water of 50° C. increases up to 300° C. Here, the control unit 101 monitors the temperatures of the feed water and the compressed air detected by the temperature sensors 111, 112, and 113, and controls opening and closing of the electric valve 35 and the bypass adjustment valve 84 such that the temperature of the compressed air supplied from the air cooler 31 to the cooling system of the turbine 23 via the cooling air supply line 33 becomes a first target temperature (200° C., for example).

As a result, by supplying the compressed air of a lower temperature to the cooling system of the turbine 23, the air cooler 31 efficiently cools the rotor 24 and the blades of the turbine 23. Then, the displacement (elongation) of the rotor 24 and the blades caused by the combustion gas is suppressed, and the clearance between the tip ends of the blades and the turbine casing can be maintained at an appropriate value. In other words, during the activation, by increasing the degree of cooling of the rotor 24 and the blades of the turbine 23, the elongation of those members is significantly suppressed, and a risk of contact with the static system is reliably inhibited.

After that, when the gas turbine 20 reaches the rated rotational speed, the blade ring on the turbine casing side is also subject to a large amount of heat from the high-temperature, high-pressure combustion gas, and the amount of displacement of the blade ring toward the outside increases. Thus, the clearance between the tip ends of the blades and the inner peripheral surface of the blade ring gradually becomes larger. Therefore, at the time t2, the degree of opening of the electric valve 35 is set to be larger than the low-level degree of opening (the degree of opening of 10 percent, for example), and at the same time, control is performed to decrease the degree of opening of the bypass adjustment valve 84 down to the predetermined degree of opening that is set in advance (the degree of opening of 0 percent, for example). When the degree of opening of the electric valve 35 becomes larger, the amount of compressed air passing through the air cooler bypass line 34 increases, and the amount of compressed air introduced into the air cooler 31 decreases. Further, when the degree of opening of the bypass adjustment valve 84 becomes smaller, the amount of feed water passing through the economizer bypass line 83 decreases, and the amount of feed water introduced into the low-pressure economizer 52 increases.

Then, in the air cooler 31, the amount of compressed air introduced from the compressor 21 via the air extraction line 32 decreases, and meanwhile, the temperature of the feed water introduced from the low-pressure economizer 52 via the first cooling fluid supply line 61 increases. Thus, in the air cooler 31, an appropriate amount of the compressed air introduced from the compressor 21 is cooled by the feed water introduced from the condenser 78.

For example, when the feed water (condensed water) from the condenser 78 is at 40° C., this feed water does not pass through the economizer bypass line 83. All of the feed water passes through the low-pressure economizer 52, and the temperature of the feed water becomes 50° C. Then, the feed water of 150° C. is introduced into the air cooler 31 by the feed water pump 60 via the first cooling fluid supply line 61. Meanwhile, the temperature of the compressed air extracted from the compressor 21 is 500° C. Therefore, the air cooler 31 cools the compressed air of 500° C. using the feed water of 150° C., and the low-temperature compressed air that has been cooled in the air cooler 31 is mixed with the high-temperature air that has passed through the air cooler bypass line 34. As a result, the compressed air of 500° C. is cooled down to 250° C., and then supplied to the cooling system of the turbine 23, while the temperature of the feed water increases from 150° C. to 350° C. Here, the control unit 101 monitors the temperatures of the feed water and the compressed air detected by the temperature sensors 111, 112, and 113, and controls opening and closing of the temperature adjustment valve 63 such that the temperature of the compressed air supplied from the air cooler 31 to the cooling system of the turbine 23 via the cooling air supply line 33 becomes a second target temperature (250° C., for example).

As a result, by supplying the compressed air of the appropriate temperature to the cooling system of the turbine 23, the air cooler 31 efficiently cools the rotor 24 and the blades of the turbine 23. Then, the displacement (elongation) of the rotor 24 and the blades caused by the combustion gas is suppressed, and the clearance between the tip ends of the blades and the turbine casing can be maintained at an appropriate value. In other words, after the increase of the load, by lowering the degree of cooling of the rotor 24 and the blades of the turbine 23, the elongation of those members is suppressed to a larger extent than during the activation, and as a result, the clearance with the static system is made narrower, and the performance is improved.

Here, changes in the temperature of the compressed air and the feed water and changes in the clearance between the rotating system and the static system of the turbine 23 will be described. When activating the gas turbine 20, a temperature T1 of the feed water introduced into the air cooler 31 is 50° C., for example, and after the gas turbine 20 reaches the rated rotational speed, the temperature increases up to 150° C. Further, when activating the gas turbine 20, a temperature T2 of the feed water discharged from the air cooler 31 is 300° C., for example, and after the gas turbine 20 reaches the rated rotational speed, the temperature increases up to 350° C. Furthermore, when activating the gas turbine 20, a temperature T3 of the compressed air that is cooled in the air cooler 31 and then delivered to the turbine 23 is 200° C., for example, and after the gas turbine 20 reaches the rated rotational speed, the temperature increases up to 250° C.

Thus, although a clearance S1 between the rotating system and the static system of the turbine 23 is slightly reduced in the transitional period, during which the rotational speed of the turbine 23 increases, the clearance S1 is maintained at an almost constant value. In this way, since the clearance S1 is maintained at the almost constant value, the clearance S1 can be changed to a clearance S3, which is smaller than the clearance S1. In this case, the clearance S2 between the rotating system and the static system of the turbine 23 can be made smaller, for example, by making the degree of opening of the electric valve 35 after the increase of the load of the gas turbine 20 larger, from the degree of opening of 10 percent, for example, and by increasing the target temperature of the compressed air.

Further, in the gas turbine 20, when the abnormal state arises in which the clearance between the rotating system and the static system in the gas turbine 23 becomes small, control is performed to decrease the degree of opening of the electric valve 35 down to or below the low-level degree of opening. Examples of the abnormal state include the following states. Specifically, the abnormal state includes a case in which the temperature of the cooling air supplied to the static system of the turbine 23 falls, or in which the amount of cooling air increases. Further, the abnormal state includes a case in which the temperature of the feed water supplied to the air cooler 31 increases, or in which the amount of feed water decreases. Furthermore, the abnormal state includes a case in which the temperature of the compressed air extracted from the compressor 21 increases, or in which the amount of compressed air decreases. In such cases as these, since the clearance between the rotating system and the static system of the turbine 23 becomes small, control is performed to decrease the degree of opening of the electric valve 35 down to or below the low-level degree of opening, so that the amount of compressed air cooled in the air cooler 31 is increased, and the temperature of the compressed air supplied to the turbine 23 is lowered.

Further, in the gas turbine 20, when the type of operation is performed in which the clearance between the rotating system and the static system of the turbine 23 becomes small, control is performed to decrease the degree of opening of the electric valve 35 down to or below the low-level degree of opening. For example, when the gas turbine load is increased more than necessary at the time of transition, the temperature of the rotating system increases, causing the clearance to become small. In such a case, control is performed to decrease the degree of opening of the electric valve 35 down to or below the low-level degree of opening, so that the amount of compressed air cooled in the air cooler 31 is increased, and the temperature of the compressed air supplied to the turbine 23 is lowered.

In this way, the gas turbine of the present embodiment includes the compressor 21, the combustor 22, and the turbine 23, and is also provided with: the air cooler 31 that subjects the compressed air extracted from the compressor 21 to heat exchange and supplies the cooled compressed air to the cooling system of the rotor system in the turbine 23; the air cooler bypass line 34 that bypasses the compressed air introduced into the air cooler 31; the electric valve 35 that is provided in the air cooler bypass line 34; and the control unit 101 that controls the opening and closing of the electric valve 35 such that, during the activation of the gas turbine 20, the degree of opening of the electric valve 35 is set at or below the low-level degree of opening, and such that, after the increase of the load of the gas turbine 20, the degree of opening of the electric valve 35 is set to be larger than the low-level degree of opening.

Therefore, during the activation of the gas turbine 20, when the degree of opening of the electric valve 35 is set at or below the low-level degree of opening, the amount of compressed air passing through the air cooler bypass line 34 decreases, and meanwhile, the amount of compressed air introduced into the air cooler 31 increases. Therefore, the temperature of the compressed air supplied to the cooling system of the rotor system in the turbine 23 falls, and the thermal elongation of the rotor system caused by the combustion gas is suppressed. Thus, the clearance between the blades and the turbine casing is set to an appropriate amount. As a result, the risk of contact between the tip ends of the blades and the inner peripheral surface of the turbine casing is inhibited, and safety can be thus secured. Further, after the increase of the load, by setting the degree of opening of the electric valve 35 to be larger than the low-level degree of opening, the amount of compressed air passing through the air cooler bypass line 34 increases, and meanwhile, the amount of compressed air introduced into the air cooler 31 decreases. Thus, in comparison to during the activation, a degree of lowering of the temperature of the compressed air supplied to the cooling system of the rotor system in the turbine decreases. As a result, the above-described gap becomes narrower, and the performance of the gas turbine can be improved.

In the gas turbine of the present embodiment, the opening degree sensor 121 is provided that detects the degree of opening of the electric valve 35, and when the opening degree sensor 121 detects that the degree of opening of the electric valve 35 is at or below the low-level degree of opening, the control unit 101 starts activating the gas turbine 20. Therefore, by confirming that the degree of opening of the electric valve 35 is at or below the low-level degree of opening before activating the gas turbine 20, it is possible to inhibit the risk of contact between the tip ends of the blades and the inner peripheral surface of the turbine casing that is caused by the gas turbine 20 having been activated in a state in which the amount of compressed air introduced into the air cooler 31 is small and by the rotor system not being sufficiently cooled.

In the gas turbine of the present embodiment, the electric valve 35 is a valve that can retain the degree of opening of the valve at the time at which the control signal indicating the degree of opening or the driving source of the valve is cut off. Thus, even when the control system or the power supply system is lost, the electric valve 35 retains the current degree of opening, so that the amount of compressed air introduced into the air cooler 31 does not change. As a result, the rotor system is appropriately cooled, and the clearance between the blades and the turbine casing can thus be appropriately maintained.

In the gas turbine of the present embodiment, when the abnormal state arises in which the clearance between the rotating system and the static system in the gas turbine 20 becomes small, the control unit 101 performs control to decrease the degree of opening of the electric valve 35 down to or below the low-level degree of opening. Therefore, when the abnormal state occurs in which the clearance between the rotating system and the static system becomes small for some reason, control is performed to decrease the degree of opening of the electric valve 35 down to or below the low-level degree of opening. As a result, the amount of compressed air introduced into the air cooler 31 increases, and the temperature of the compressed air supplied to the cooling system of the rotor system falls. Then, the thermal elongation of the rotor system caused by the combustion gas is suppressed, and the clearance between the blades and the turbine casing is expanded. As a result, the safety can be improved.

In the gas turbine of the present embodiment, when the type of operation is performed in which the clearance between the rotating system and the static system in the gas turbine 20 becomes small, the control unit 101 performs the control to decrease the degree of opening of the electric valve 35 down to or below the low-level degree of opening. Therefore, when the type of operation is performed in which the clearance between the rotating system and the static system in the gas turbine 20 becomes small in response to changes in the load and the like, the control is performed to decrease the degree of opening of the electric valve 35 down to or below the low-level degree of opening. As a result, the amount of compressed air introduced into the air cooler 31 increases, and the temperature of the compressed air supplied to the cooling system of the rotor system falls. Thus, the thermal elongation of the rotor system caused by the combustion gas is suppressed, and the gap (clearance) between the blades and the turbine casing is expanded. As a result, the safety can be improved.

In the gas turbine of the present embodiment, the degree of opening of the electric valve 35 at or below the low-level degree of opening represents a state in which the electric valve 35 is slightly open. If control is performed on the degree of opening of the electric valve 35 to completely close the electric valve 35, there is a risk that the flow of the compressed air in the air cooler bypass line 34 may stagnate and a drain may occur due to a fall in temperature. However, by setting the degree of opening of the electric valve 35 at or below the low-level degree of opening as the slightly open state, a tiny amount of the compressed air flows through the air cooler bypass line 34, so the occurrence of the drain can be suppressed.

Further, the gas turbine combined cycle plant of the present embodiment is provided with the gas turbine 20, the exhaust heat recovery boiler 40, the steam turbine 70, the condenser 78, and the air cooler 31, and is further provided with the economizer bypass line 83 that bypasses the feed water introduced into the low-pressure economizer 52, and the bypass adjustment valve 84 that is provided in the economizer bypass line 83. During the activation of the gas turbine 20, the control unit 101 performs the control to close the electric valve 35 such that the degree of opening of the electric valve 35 is at or below the low-level degree of opening, in order to decrease the amount of compressed air bypassed to the air cooler bypass line 34, and at the same time, performs the control to increase the degree of opening of the bypass adjustment valve 84, in order to increase the amount of feed water bypassed to the economizer bypass line 83. Further, after the increase of the load of the gas turbine 20, the control unit performs the control to open the electric valve 35 such that the degree of opening of the electric valve 35 is larger than the low-level degree of opening, in order to increase the amount of compressed air bypassed to the air cooler bypass line 34, and at the same time, performs the control to decrease the degree of opening of the bypass adjustment valve 84, in order to decrease the amount of feed water bypassed to the economizer bypass line 83.

Therefore, during the activation of the gas turbine 20, since the amount of compressed air introduced into the air cooler 31 increases and the temperature of the feed water for cooling the compressed air falls, the temperature of the compressed air supplied to the cooling system of the rotor system in the turbine 23 can be lowered. As a result, the thermal elongation of the rotor system caused by the combustion gas is suppressed, and the clearance between the blades and the turbine casing is set to the appropriate amount, so that the risk of contact between the tip ends of the blades and the inner peripheral surface of the turbine casing can be inhibited. Thus, the safety can be secured.

Further, after the increase of the load, the degree of opening of the electric valve 35 is set to be larger than the low-level degree of opening, in order to increase the amount of compressed air bypassed to the air cooler bypass line 34, and at the same time, the control is performed to decrease the degree of opening of the bypass adjustment valve 84, in order to decrease the amount of feed water bypassed to the economizer bypass line 83. Specifically, after the increase of the load of the gas turbine 20, when the amount of compressed air passing through the air cooler bypass line 34 increases, the amount of compressed air introduced into the air cooler 31 decreases. Further, when the amount of feed water passing through the economizer bypass line 83 decreases, the amount of feed water introduced into the low-pressure economizer 52 increases. Thus, in comparison to during the activation, a degree of lowering of the temperature of the compressed air supplied to the cooling system of the rotor system in the turbine decreases. As a result, the above-described gap becomes narrower, and the performance of the gas turbine can be improved.

Further, in the activation method of the gas turbine of the present embodiment, during the activation of the gas turbine 20, the degree of opening of the electric valve 35 is set at or below the predetermined low-level degree of opening, and after the increase of the load of the gas turbine 20, the degree of opening of the electric valve 35 is set to be larger than the low-level degree of opening. Therefore, during the activation of the gas turbine 20, the temperature of the compressed air supplied to the cooling system of the rotor system in the turbine 23 falls even further, and the thermal elongation of the rotor system caused by the combustion gas is suppressed. Then, after the increase of the load of the gas turbine 20, the gap (clearance) between the blades and the turbine casing becomes the appropriate amount, and the risk of contact between the tip ends of the blades and the inner peripheral surface of the turbine casing is inhibited. As a result, the safety can be secured.

Further, after the increase of the load, the degree of opening of the electric valve 35 is set to be larger than the low-level degree of opening, in order to increase the amount of compressed air bypassed to the air cooler bypass line 34, and at the same time, the control is performed to decrease the degree of opening of the bypass adjustment valve 84, in order to decrease the amount of feed water bypassed to the economizer bypass line 83. Specifically, after the increase of the load of the gas turbine 20, when the amount of compressed air passing through the air cooler bypass line 34 increases, the amount of compressed air introduced into the air cooler 31 decreases. Further, when the amount of feed water passing through the economizer bypass line 83 decreases, the amount of feed water introduced into the low-pressure economizer 52 increases. Thus, in comparison to during the activation, a degree of lowering of the temperature of the compressed air supplied to the cooling system of the rotor system in the turbine decreases. As a result, the above-described gap becomes narrower, and the performance of the gas turbine can be improved.

Note that in the above-described embodiment, although the description has been made while applying the gas turbine of the present invention to the combined cycle plant, the present invention is not limited to this configuration, and the gas turbine may be applied to a simple cycle that is not provided with an exhaust heat recovery boiler.

REFERENCE SIGNS LIST

11 Gas turbine combined cycle plant
12 Gas turbine part
13 Steam turbine part
20 Gas turbine
21 Compressor
22 Combustor
23 Turbine
31 Air cooler
34 Air cooler bypass line
35 Electric valve (first valve)
40 Exhaust heat recovery boiler
41 High-pressure unit
42 High-pressure economizer
51 Low-pressure unit
52 Low-pressure economizer
70 Steam turbine
71 High-pressure turbine
72 Low-pressure turbine
78 Condenser
83 Economizer bypass line
84 Bypass adjustment valve (second valve)
101 Control unit
111 First temperature sensor
112 Second temperature sensor
113 Third temperature sensor
121 Opening degree sensor (detection unit)

The invention claimed is:
1. A combined cycle plant comprising:
a gas turbine including:
a compressor configured to compress air;
a combustor configured to mix and combust fuel and compressed air compressed by the compressor;
a turbine configured to obtain rotational power from combustion gas generated by the combustor;
an air cooler configured to subject compressed air extracted from the compressor to heat exchange, and to supply cooled compressed air to a cooling system of a rotor system in the turbine;
an air cooler bypass line configured to allow the compressed air extracted from the compressor to bypass the air cooler;
a cooler bypass valve provided in the air cooler bypass line; and
a controller configured to control opening and closing of the cooler bypass valve such that, during activation of the gas turbine, a degree of opening of the cooler bypass valve is set at or below a pre-set predetermined low-level degree of opening, and such that, after an increase of a load of the gas turbine, the degree of opening of the cooler bypass valve is set to be larger than the low-level degree of opening, wherein the cooler bypass valve is open when the degree of opening is set at or below the low-level degree of opening;
an exhaust heat recovery boiler configured to generate steam from exhaust heat of exhaust gas discharged from the gas turbine;
a steam turbine configured to be driven by the steam generated by the exhaust heat recovery boiler;
a condenser configured to condense the steam discharged from the steam turbine and generate water;

a feed water line configured to deliver feed water, obtained from the condenser via an economizer, to the air cooler and cause the feed water to exchange heat with compressed air;

an economizer bypass line configured to bypass feed water introduced into the economizer; and an economizer bypass valve provided in the economizer bypass line, wherein, during activation of the gas turbine, the controller performs control to close the cooler bypass valve such that the degree of opening of the cooler bypass valve is set at or below the low-level degree of opening, in order to decrease an amount of compressed air allowed to flow through the air cooler bypass line, and at the same time, performs control to increase a degree of opening of the economizer bypass valve, in order to increase an amount of feed water allowed to flow through the economizer bypass line, and after an increase of the load of the gas turbine, the controller performs control to open the cooler bypass valve such that the degree of opening of the cooler bypass valve is set to be larger than the low-level degree of opening, in order to increase the amount of compressed air allowed to flow through the air cooler bypass line, and at the same time, performs control to decrease the degree of opening of the economizer bypass valve, in order to decrease the amount of feed water allowed to flow through the economizer bypass line.

2. The combined cycle plant according to claim 1, wherein the gas turbine further includes a detector configured to detect the degree of opening of the cooler bypass valve, wherein, when the detector detects that the degree of opening of the cooler bypass valve is at or below the low-level degree of opening, the controller starts activating the gas turbine.

3. The combined cycle plant according to claim 2, wherein the cooler bypass valve is configured to retain the degree of opening thereof when a control signal indicating a degree of opening or a driving source of the cooler bypass valve is cut off.

4. The combined cycle plant according to claim 1, wherein, when an abnormal state arises during activation of the gas turbine, in which such abnormal state a clearance between a rotating system and a static system in the gas turbine becomes small, the controller performs control to decrease the degree of opening of the cooler bypass valve to or below the low-level degree of opening.

5. The combined cycle plant according to claim 1, wherein, when an operation is performed in which the clearance between the rotating system and the static system in the gas turbine becomes small, the controller performs control to decrease the degree of opening of the cooler bypass valve to or below the low-level degree of opening.

* * * * *